United States Patent [19]

Makino

[11] Patent Number: 4,752,421
[45] Date of Patent: Jun. 21, 1988

[54] METHOD OF SUPPLYING AIR MASSES AND PRODUCING JETS OF WATER

[75] Inventor: Masahiko Makino, Funabashi, Japan

[73] Assignee: Kaiyo Kogyo Kabushiki Kaisha, Tokyo, Japan

[21] Appl. No.: 910,992

[22] Filed: Sep. 24, 1986

[30] Foreign Application Priority Data

Apr. 1, 1986 [JP] Japan .................................. 61-75165
May 2, 1986 [JP] Japan ................................ 61-102624

[51] Int. Cl.$^4$ .............................................. B01F 3/04
[52] U.S. Cl. ..................................... 261/77; 261/120; 261/124; 210/242.2
[58] Field of Search .................. 261/77, 120, 124; 210/242.2

[56] References Cited

U.S. PATENT DOCUMENTS

| | | |
|---|---|---|
| 3,148,509 | 9/1964 | Laurie . |
| 3,246,761 | 4/1966 | Bryan et al. ........................ 261/77 |
| 3,452,966 | 7/1969 | Smolski . |
| 3,592,450 | 7/1971 | Rippon .............................. 261/123 |
| 3,628,775 | 12/1971 | McConnell et al. ................. 261/77 |
| 3,852,384 | 12/1974 | Bearden . |
| 3,931,370 | 1/1976 | Murphy . |
| 4,169,873 | 10/1979 | Lipert ................................ 261/77 |
| 4,187,263 | 2/1980 | Lipert ................................ 261/77 |
| 4,231,863 | 11/1980 | Sutphin . |
| 4,293,506 | 10/1981 | Lipert . |
| 4,327,042 | 4/1982 | Hagino et al. . |
| 4,356,131 | 10/1982 | Lipert ................................ 261/77 |
| 4,436,675 | 3/1984 | Hisao et al. ....................... 261/120 |
| 4,569,804 | 2/1986 | Murphy ............................. 261/77 |
| 4,702,830 | 10/1987 | Makino et al. .................... 261/77 |

FOREIGN PATENT DOCUMENTS 2557559 7/1985 France .
60-176300 11/1985 Japan .

Primary Examiner—Tim Miles
Attorney, Agent, or Firm—Wenderoth, Lind & Ponack

[57] ABSTRACT

A method is provided for use with an apparatus which produces jets of water through a vertical water diffuser tube by supplying individually formed air bubble masses at regular intervals, which are followed by the water being drawn under the action of the air bubble masses. The method improves the water processing efficiency and ability of the apparatus by defining the volumetric quantity of a formed air mass in relation to the diameter of the particular air diffuser tube and defining a certain relationship between the length L (m) of the tube through which the rises and the time interval T (sec) at which the individual air bubble masses are produced.

4 Claims, 9 Drawing Sheets

METHOD OF SUPPLYING AIR MASSES AND PRODUCING JETS OF WATER

BACKGROUND OF THE INVENTION

1. Field of the Invention

The present invention relates to a method used with an apparatus that deals with water resources such as lakes and marshes, water reservoirs, etc., and more particularly to a method whereby large quantities of water can be processed for cleaning the water or for other purposes by producing a circulating flow of the water over a wide radial area under the action of supplied air bubble masses.

2. Description of the Prior Art

A conventional apparatus that includes a vertical pumped-water tube disposed under water for producing jets of water under the drawing action of individual formed air bubble masses to be supplied at regular intervals is known (as disclosed in Japanese Examined Pat. No. 42-5795, Unexamined patent application No. 58-70895, and U.S. Pat. No. 4,436,675).

The conventional prior apparatuses have no specific parameters that define the relationship between the volumetric quantity of individual air bubble masses that contain the amount of air supplied by the air chamber and the diameter of the particular water diffuser tube. In other words, the conventional apparatuses disregard the volume of the air mass in relation to the tube diameter. The time interval at which each succeeding air bubble mass is to be supplied is also not considered as one of the important factors. For practical purposes, this time interval is determined improperly, so that it is practically impossible to make an effective use of the fluid energy that the individual air bubble masses provide as they are rising under their own buoyancy.

SUMMARY OF THE INVENTION

In view of the above-described problems of the conventional prior art technology, the present invention proposes to offer a method that enables the apparatus to operate with high efficiency.

It is therefore one object of the present invention to provide a method whereby the volumetric quantity of each individual air bubble mass as it is formed and the diameter of the particular tube through which the air bubble mass followed by the water under the drawing action of the air bubble mass rises have a well-defined relationship, and the length of the passage of the tube through which each individual air bubble mass rises and the time interval at which each succeeding air bubble mass is formed or supplied also have a specific proportional relationship.

In implementing the above object of the present invention, the relationship between L and T is defined as a function of the value of L, where L represents the length (m) of the passage of a tube through which a given air bubble rises, and T represents the time interval (sec) between each successive air bubble mass.

Another object of the present invention is to supply a volumetric quantity of an air bubble mass in a certain proportion to the spherical volume of a sphere having a diameter defined by the given diameter of the tube.

BRIEF DESCRIPTION OF THE DRAWINGS

The above and other objects, advantages, and features of the present invention will become apparent from the detailed description of several preferred embodiments of the present invention that follows by referring particularly to the accompanying drawings, in which.

DESCRIPTION OF THE PREFERRED EMBODIMENTS

Figure 1:
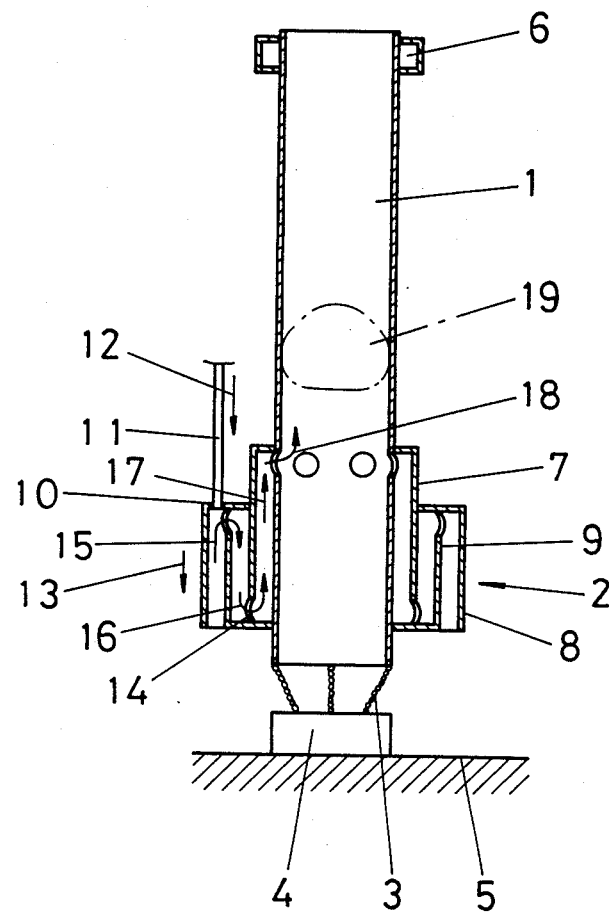
FIG. 1 is a front elevation of one example of the apparatus to which the method of the present invention is implemented, showing part of the apparatus in section.

The term "air bubble mass" or "air bubble" referred to in the following description means any form of a single block containing a given volume of air that is produced by supplying that volume of air from any air supply source.

Several attempts have been made to clean water resources by producing jets of water by supplying air bubble masses at regular intervals. One typical apparatus that incorporates those attempted solutions has been mentioned earlier. The mechanism that the conventional apparatus employs for cleaning the water resources is subject to many problems yet to be solved, such as those due to a lack of definition of parameters including those of the diameter of the tube, its length, the quantity of air contained in individual air bubble masses to be supplied and formed at specific time intervals, the time intervals of those air bubble masses as they are supplied, and so on. The present inventor has studied such a problem from his long-time experience in this field, and has realized that a high efficiency can be achieved by defining a certain relationship between the diameter of the tube and the quantity of air to be supplied for forming an air bubble, as well as a certain relationship between the length of the tube and the time interval at which each succeeding air bubble mass is to be produced.

For practical purposes, therefore, it has been determined that the apparatus could perform best by implementing parameters establishing specific relationships between the tube diameter and the air quantity of an air bubble mass and between the tube length and time interval. The method according to the present invention comprises the use of the specific parameter values that define those relationships, i.e., the quantity of air forming an air bubble in relation to the diameter of the tube and the time interval of air bubble masses in relation to the length of the tube.

In the method whereby air bubble masses are supplied and formed at specific time intervals, the quantity of air that is contained in each air bubble mass is determined to be 0.3 to 1.75 times the spherical volume of a sphere having a diameter equal to the diameter of the tube. The apparatus that is used in practicing the method is designed to meet those requirements. The optimum value ranges for the air volume requirements have been determined from experimental results in the table below.

TABLE 1

Average Flow Rate Table
Relationship between Air Chamber Volume and Air Supply Quantity

| Air Chamber vol. | Air Supply Qty. | | | | | | | |
|---|---|---|---|---|---|---|---|---|
| | 1.0 m³/hr | 1.5 | 2.0 | 2.5 | 3.0 | 3.5 | 4.0 | 4.5 |
| 0.30* | 0.36 m/sec | 0.41 | 0.46 | 0.51 | | | | |
| 0.50 | 0.32 | 0.41 | 0.46 | 0.50 | 0.54 | | | |
| 0.75 | 0.30 | 0.40 | 0.46 | 0.50 | 0.55 | 0.58 | 0.61 | 0.64 |
| 1.00 | 0.28 | 0.36 | 0.42 | 0.47 | 0.52 | 0.57 | 0.60 | 0.63 |
| 1.25 | 0.25 | 0.32 | 0.38 | 0.45 | 0.50 | 0.55 | 0.59 | 0.60 |
| 1.50 | 0.19 | 0.27 | 0.31 | 0.34 | 0.42 | 0.48 | 0.51 | 0.53 |
| 1.75 | 0.16 | 0.24 | 0.31 | 0.35 | 0.43 | 0.47 | 0.50 | 0.53 |

*the ratio of the actual volume to the spheric volume.
Note:
(1) The apparatus used for testing purposes includes a 200 mm- diameter and 2.5 m-length tube.
(2) The air chamber volume represents the spherical volume of a sphere having a diameter defined by the diameter of the tube compared to the air quantity of an air bubble mass to be supplied one at a time.
(3) The values for the quantity of air to be supplied are given as those at atmospheric pressure at 20° C.

Table 1 presents the values for the water flow rates, which have been obtained from Table 1.

TABLE 2

Average Water Flow Rates
Relationship of Water Flow Rate to Air Chamber Volume and Air Supply Quantity

| Air Chamber vol. | Air Supply Qty. | | | | | | | |
|---|---|---|---|---|---|---|---|---|
| | 1.0 m³/hr | 1.5 | 2.0 | 2.5 | 3.0 | 3.5 | 4.0 | 4.5 |
| 0.30 | 11.3 l/sec | 12.9 | 14.4 | 16.0 | | | | |
| 0.50 | 10.0 | 12.9 | 14.4 | 15.7 | 17.0 | | | |
| 0.75 | 9.4 | 12.6 | 14.4 | 15.7 | 17.3 | 18.2 | 19.2 | 20.1 |
| 1.00 | 8.8 | 11.3 | 13.2 | 14.8 | 16.3 | 17.9 | 18.8 | 19.8 |
| 1.25 | 7.9 | 10.0 | 11.9 | 14.1 | 15.7 | 17.3 | 18.5 | 18.8 |
| 1.50 | 6.0 | 8.5 | 9.7 | 10.7 | 13.2 | 15.1 | 16.0 | 16.6 |
| 1.75 | 5.0 | 7.5 | 9.7 | 11.0 | 13.5 | 14.8 | 15.7 | 16.6 |

Note:
(1) The air chamber volume represents the corresponding values at atmospheric pressure at 20° C.
(2) The values for the air supply quantity correspond to the quantities of air bubbles to be supplied one at a time (80 to 100% of the air chamber volume), which are equal to x times the spherical volume.
(3) The water flow rates are in liters per second (l/sec)

As it can be seen from the above table, for any given value of the quantity of air, the flow rate at which the water is drawn by the air bubble mass and rises tends to increase as the air chamber volume is made smaller. It is also observed that the flow rate increases with an increase in the quantity of air (which is delivered into the air chamber), and when the quantity of air is equal to 0.30 to 1.25 times the spherical volume (as defined by the diameter of the tube), the flow rate is the greatest. When it is 0.3 to 0.5 times the spheric volume, however, the time interval at which air is supplied must be shorter. In this case, the energy with which the water is rising under its inertial action after it is placed out of the drawing action of the preceding air bubble mass cannot be utilized fully. For practical purposes, therefore, the range of 0.75 and 1.25 proves to be optimal in order to keep the machine running with high efficiency. Below 0.75, the amount of water that can be processed for a given quantity of air supply is relatively small, and above 1.25, it will be decreased substantially.

The important factor next to be considered is the construction of the air chamber that supplies individual air bubbles masses at regular intervals. Although it is observed that the type of air chamber that takes advantage of the siphoning action meets practical requirements such as having a simplified construction, ease of maintenance, and fault tolerance, other types of air supply sources such as an automatic valve-operated pump, reciprocal-pump, and other prior-art sources may be used. It should be noted, however, that when the siphon-type air chamber is used, it may be located anywhere other than around the bottom of the tube. Instead, it may be equipped with air supply nozzles, which extend into the bottom end or intermediate wall of the tube.

The method according to the present invention takes advantage of the action of the individually formed air bubble masses that are rising through the vertical tube having the upper end thereof below the water surface, so that the water near the bottom can be raised upwardly together with those air bubble masses. The method is provided so that it can satisfy the following conditions:

$$0.5L \leq T \leq 4-6L \text{ for } L \geq 10m \quad (1)$$

$$0.5L \leq T \leq 10L \text{ for } 2m \leq L < 10m \quad (2)$$

$$L \leq T \text{ for } L < 2m \quad (3)$$

where L (m) represents the length of travel through the tube which a given air mass rises, and T (sec) represents the time interval at which each succeeding air bubble mass is supplied. Under the above conditions, the running cost can be reduced while maintaining a higher running efficiency.

In practicing the method, the air/water diffuser tube is usually disposed under water with a top open end thereof 1 m to 20 m beneath the water surface 38. When the water resources are deeper and the tube 1 is installed with the bottom end thereof located near the bottom so that the water near the bottom can be raised, the top end of the tube may be located 20 m to 30 m below the water surface. The time interval T should usually be between 5 sec and 30 sec for a tube having a length greater than 2 m but less than 10 m, 15 sec and 100 sec for a tube longer than 10 m, and 20 sec and 80 sec for a tube having a length of between 10 m to 15 m.

Figure 12:
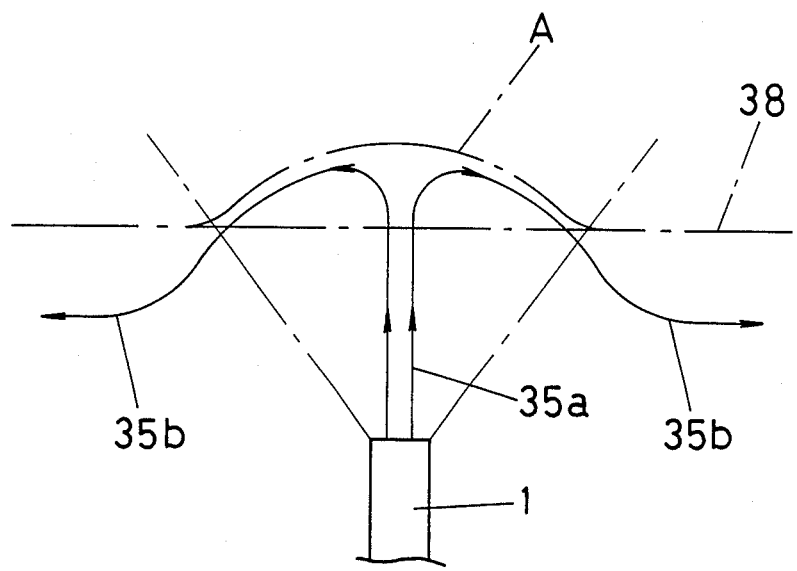
FIG. 12 is a schematic diagram illustrating how water disperses after a jet of water following a given air bubble mass is projected from the tube.
Figure 13:
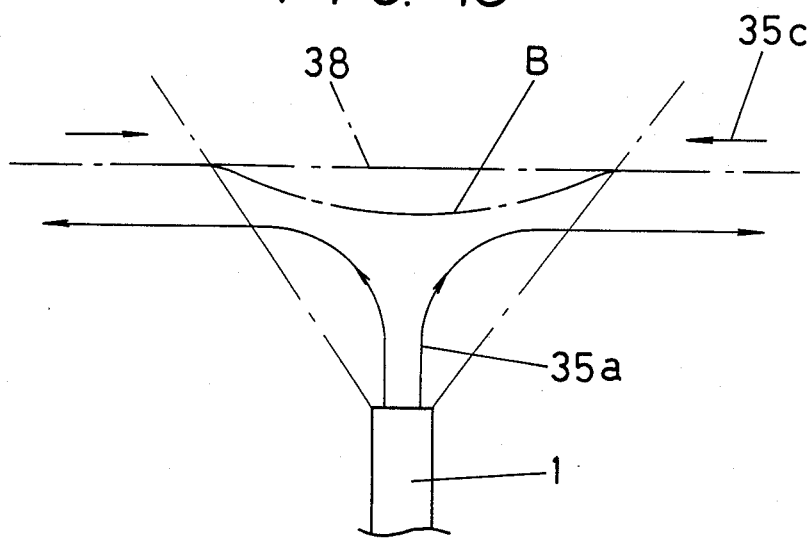
FIG. 13 is a schematic diagram illustrating how the surface of water located immediately above the tube presents a depression as indicated by B.

When the top end of the tube is located 5 m to 15 m beneath the surface and the air bubble mass is rising at the rate, of 1 m/sec, the water near the top end is raised upwardly by the combined action of the rising air bubble mass followed by the water below it, as indicated by the dot-dash line A in FIG. 12. The water rising up to the top end in the direction of an arrow 35a is jetted, dispersing in radial directions as shown by 35b. The maximum flow rate at which this dispersion can occur is achieved when the water is flowing just one meter below the surface, as actually measured (provided that the top end of the tube is located 5 m below the surface). When the water is raised at a lower rate, which necessarily follows from a rapid drop in the amount of the water to be jetted, the portion of the water surface that is located just above the tube will produce a depression as shown by B in FIG. 13, which causes the surrounding water 38 to be drawn into the depressed area as indicated by an arrow 35c. Then, the water rising from the bottom (whose temperature is 10° C.) will meet with the upper-surface water (which is at 20° C.), and the resulting mixture water, which is at 18° C., increases to five times the bottom water, and is dispersed in radial directions. As this dispersion goes farther, the temperature difference between the bottom and upper waters becomes smaller, the dispersed water can flow 1 m to 3 m deep, covering a wide-range area (which may often extend over 1000 m).

Figure 6:
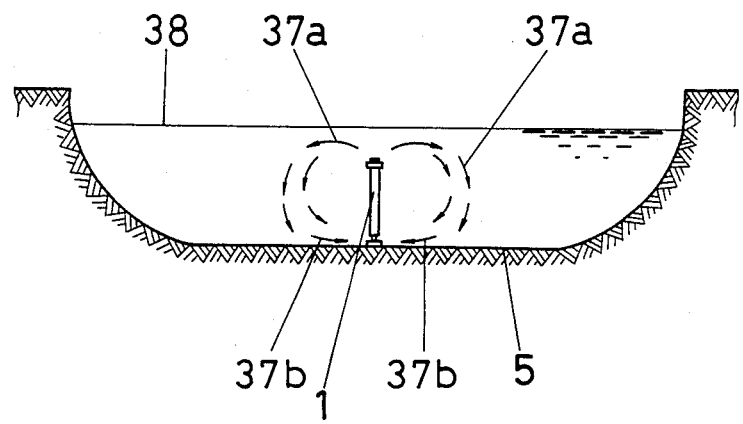
FIG. 6 is a schematic diagram illustrating results when the time interval at which individual air bubble masses are supplied is shorter than in the method of the present invention.
Figure 7:
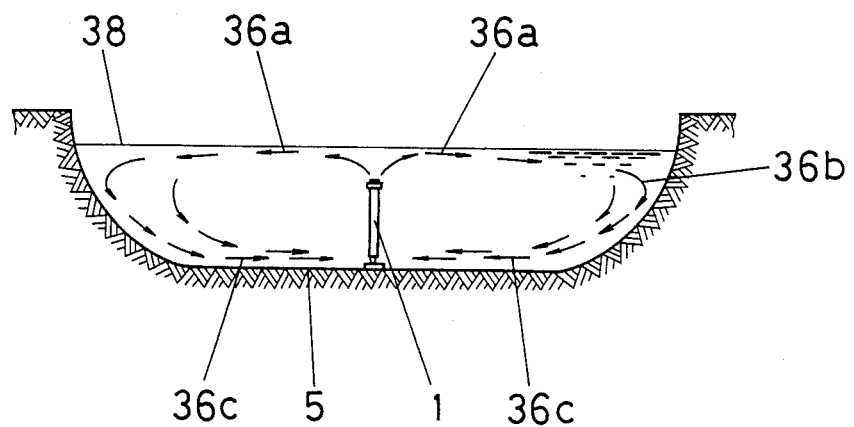
FIG. 7 is a schematic diagram illustrating results when the proper time interval is provided according to the method of the present invention.

When the method is applied to a water reservoir, for example, having a configuration shown in FIGS. 6 and 7, the water flow can circulate over a wide-range area as shown by arrows 36a, 36b and 36c.

Figure 8:
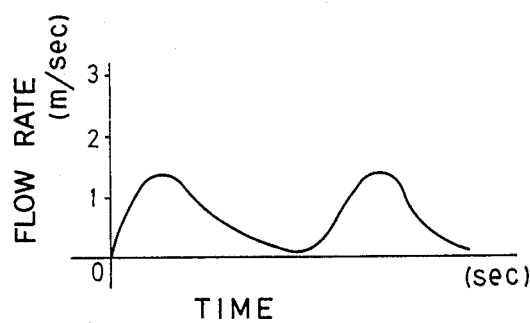
FIG. 8 is a diagram showing variations in the air flow rate with time providing the results shown in FIG. 7.
Figure 9:
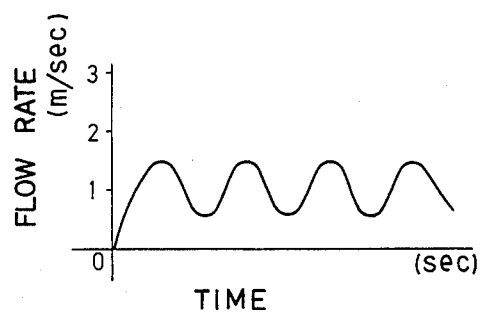
FIG. 9 is a diagram showing variations in the air flow rate with time according to ninth and twelfth embodiments of the present invention.
Figure 10:
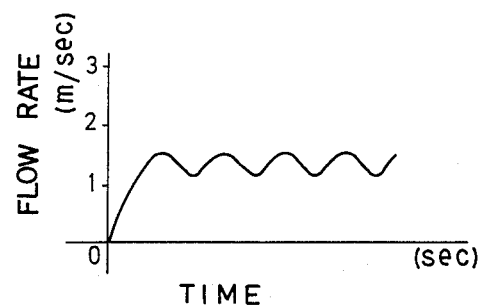
FIG. 10 is a diagram showing variations in the air flow rate with time according to eighth and eleventh embodiments of the present invention.
Figure 11:
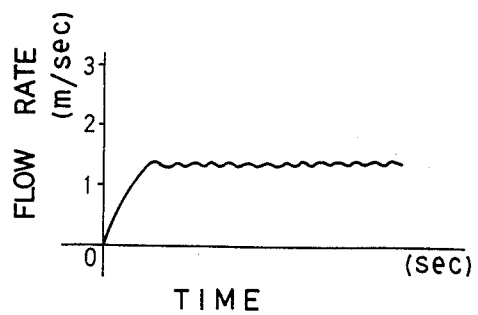
FIG. 11 is a diagram showing variations in the air flow rate with time when the air bubble masses are supplied consecutively.

The water which is being raised under the action of the air bubble mass 19 through the tube reaches its maximum flow rate when the air bubble mass has risen to the top end of the tube. There, the water gradually rises slowly because of its inertial action. When another succeeding air bubble mass is produced and rises through the tube, the water is boosted by that air bubble mass and flows at a gradually increasing flow rate (as measured at the bottom end of the tube). FIGS. 8 through 11 illustrate how the flow rate (m/sec) changes when the time interval at which air bubble masses are formed and supplied is varied. In all of those figures, it is assumed that the tube has a length of 10 m. FIG. 8 shows the flow rate curve when the time interval is long enough (30 seconds). The curve shown in FIG. 9 is for the relatively short interval of 15 seconds. When the interval is shorter (10 seconds), the flow rate changes as shown in FIG. 10. The curve shown in FIG. 11 represents the situation in which air masses are supplied consecutively.

For practical purposes, it is economical that the time interval in FIG. 8 or a time interval between those represented in FIGS. 8 and 9 be selected. As described above, when the air bubble masses are rising at the closest intervals (FIG. 10), the surface area immediately above the tube is only occupied by the water throughout the tube. Since the two waters do not meet, the rising water is not affected by its surrounding water, and large temperature difference occurs. That is, the rising water which was at 10° C. has a slight temperature change not more than 15° C. when it appears above the tube. Such a large temperature difference causes water circulation due to convection within a limited region around the tube, as shown in FIG. 6. That is, the area of action by the diffused water is limited to a radius of less than 10 m. In this way, the jet of water cannot diffuse over the wide area.

One of the water quality improvements to which the water diffuser tube 1 contributes is the increasing of the content of dissolved oxygen in the water resources. However, as the air from any compressed air supply source contains a relatively small amount of dissolved oxygen, the limited-capacity tube is useless in improving the water quality, particularly when the water resources are large-scale reservoirs, for example. For a reservoir that contains 0.5 to one million tons of water, for example, one or two water diffuser tubes which are 40 cm in diameter and 10 m long may be used so that additional dissolved oxygen can be added to the water in a short time. It is know that water quality can be improved in this way. In this case, the water on the surface containing much dissolved oxygen and the water on the bottom containing little dissolved oxygen meet, and the resulting water contains a sufficient supply of oxygen. This provides an effective means for improving the water quality, which could not be achieved simply by employing the conventional air diffuser pipes on the bottom.

As described, the method according to the present invention defines the time interval t a certain value, and the individual formed air bubble masses are supplied at the defined time interval, which is fully to be described below. This is a prerequisite for not only improving the running cost but also for improving the water quality.

The following examples describe the relationship between the tube diameter and the quantity of air supply (see FIGS. 1 through 4).

EXAMPLE 1

The water diffuser tube 1 that is used in this example has a 20 cm diameter and is 2.5 m long (the length of the tube through which an air bubble mass rises, which applies to all of the following examples), and is installed upright under water that is 4 m deep. An air supply chamber 2 that has a capacity of 3.1 l (which is equal to 0.75 times the volume of the air chamber) is provided at the bottom of the tube 1. The air chamber 2 is supplied with air at the rate of 2.5 $m^3$ per hour, from which ten air bubble masses are supplied per minute. For each formed air bubble mass that rises through the tube 1, water is drawn by said air bubble mass. In total, the water following the air bubble mass rises at an average rate of 0.5 m/sec.

EXAMPLE 2

The same water diffuser tube 1 as in EXAMPLE 1 is used. The air chamber has a capacity of 2.1 liters (which is equal to 0.50 times the volume of the air chamber). The air chamber is supplied with air at the rate of 2.0 $m^3$ per hour, and produces twelve air bubble masses per minute. The average water flow rate through the tube is 0.46 m/sec.

EXAMPLE 3

The same water diffuser tube 1 as in EXAMPLE 1 is used. The capacity of the air chamber 2 is 1.3 liters (which is equal to 0.3 times the volume of the air chamber). Air is fed into the air chamber at the rate of 2.0 $m^3$ per hour, which supplies 19 air bubble masses per minute. In this case, the average water flow rate is 0.46 m/sec.

EXAMPLE 4

The water diffuser tube 1 used is the same as for EXAMPLE 1, and the air chamber 2 is capable of containing 5.2 liters of air (which is equal to 1.25 times the volume of the air chamber). Then, air is fed into the air chamber at the rate of 2.0 m$^3$ per hour, and five air bubble masses are formed per minute. The rate at which the water is rising through the tube is 0.38 m/sec. on average.

EXAMPLE 5

This example uses the same tube 1 as in EXAMPLE 1, and the air chamber provides 6.3 liters of air (which is equal to 1.50 times the volume of the air chamber). Then, air is supplied to the air chamber at the rate of 2.0 m$^3$, which produces four air bubble masses per minute. The resulting average rate of the water is 0.31 m/sec.

The examples that follow are provided for describing the apparatus used in practicing the method.

EXAMPLE 6

As shown in FIG. 1, the apparatus comprises a water diffuser tube 1, at the bottom of which an air chamber surrounds the tube in an air communicating relationship. The tube carries a weight 4 at the bottom, which is anchored to the tube by means of a chain 3. The weight 4 is settled on the water bottom 5 for placing the tube immovably in position. The tube 1 includes a float chamber 6 at the top, which cooperates with the bottom weight to keep the tube 1 upright under the water.

The air chamber 2 includes an outer casing 7 and an inner casing 8 which are separated by communicate with each other. Those outer and inner casings 7 and 8 each define an air room separated by a separator casing 9.

Figure 4:
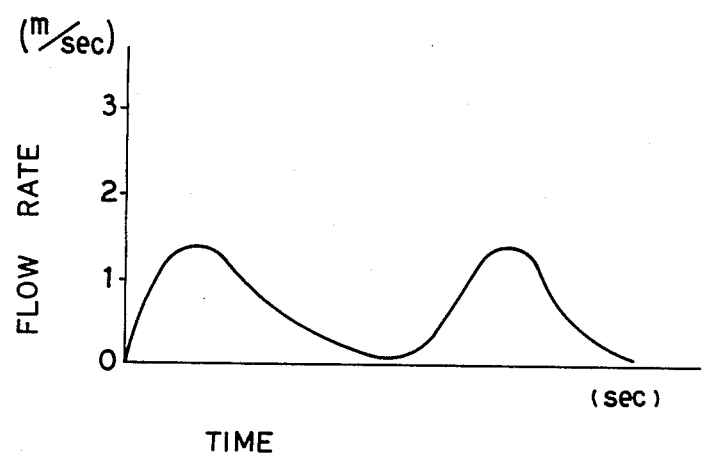
FIG. 4 is a diagram showing variations in the air flow rate as a function of the time.
Figure 5:
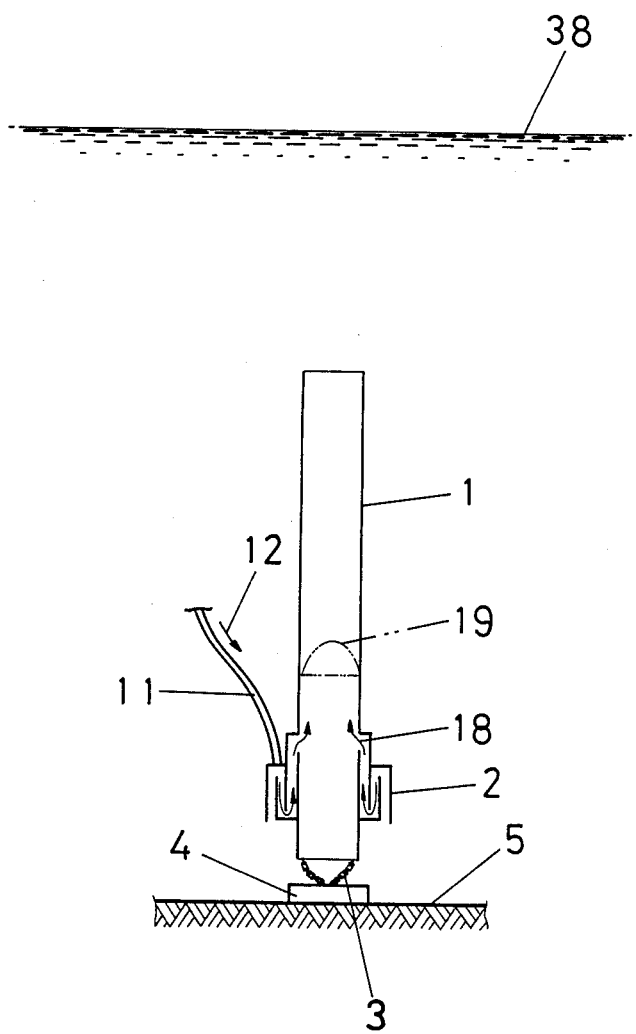
FIG. 5 is a diagram illustrating the principle of the operation of the apparatus of which the method of the present invention is embodied.

An air supply hose 11 from any compressed air supply source (not shown) extends into the outer casing 7 through a top cover 10 which is rigidly mounted over the air rooms 7 and 8. The compressed air is fed through the air hose 11 as indicated by an arrow 12, and enters the air chamber 2. As the air accumulates within the air chamber 2, the water filling the air chamber 2 is gradually displaced as indicated by an arrow 13. When the water level is lowered down to a level which exposes the holes 14 through which the air chamber 2 and tube 1 communicate with each other, the air 19 within the air chamber 2 travels from the outer casing 8 through the separator casing 9 into the inner casing 7 and then into the space defined between the inner casing 7 and the tube outer wall, as indicated by arrows 15, 16, and 17. Finally, the air enters the tube 1 through the holes 14 as indicated by 18, and is formed into an air bubble or air bubble mass 19. When the air bubble 19 is rising through the tube 1, it expands to the inner diameter of the tube 1. Thus, the air bubbles are brought into intimate contact with the inner wall of the tube 1. The rising action of the air bubble is then converted into water pumping action that draws the water below the air bubble. The air bubble gradually rises with an increasing speed, until it reaches the top end of the tube 1, at which it leaves the tube 1. After the air bubble 19 has left, its pumping action is no longer effective, but the water drawn by that air bubble still continues to rise due to its inertia. The speed with which the water is thus rising varies according to the curve as shown in FIG. 4. Then, a next succeeding air bubble is supplied at a time before the water completely loses its own rising power facilitated by inertia. Thus, the water is boosted by the next air bubble until it reaches the top end from which it is jetted.

EXAMPLE 7

Figure 2:
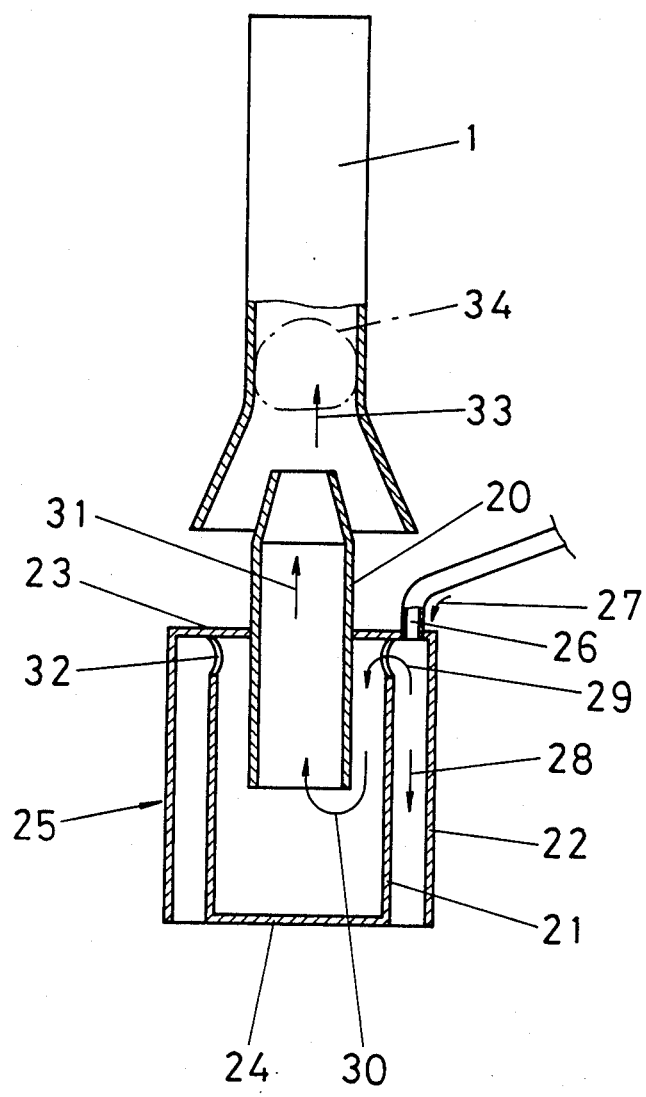
FIG. 2 is also a front elevation of another example of the apparatus, showing a partial section thereof.
Figure 3:
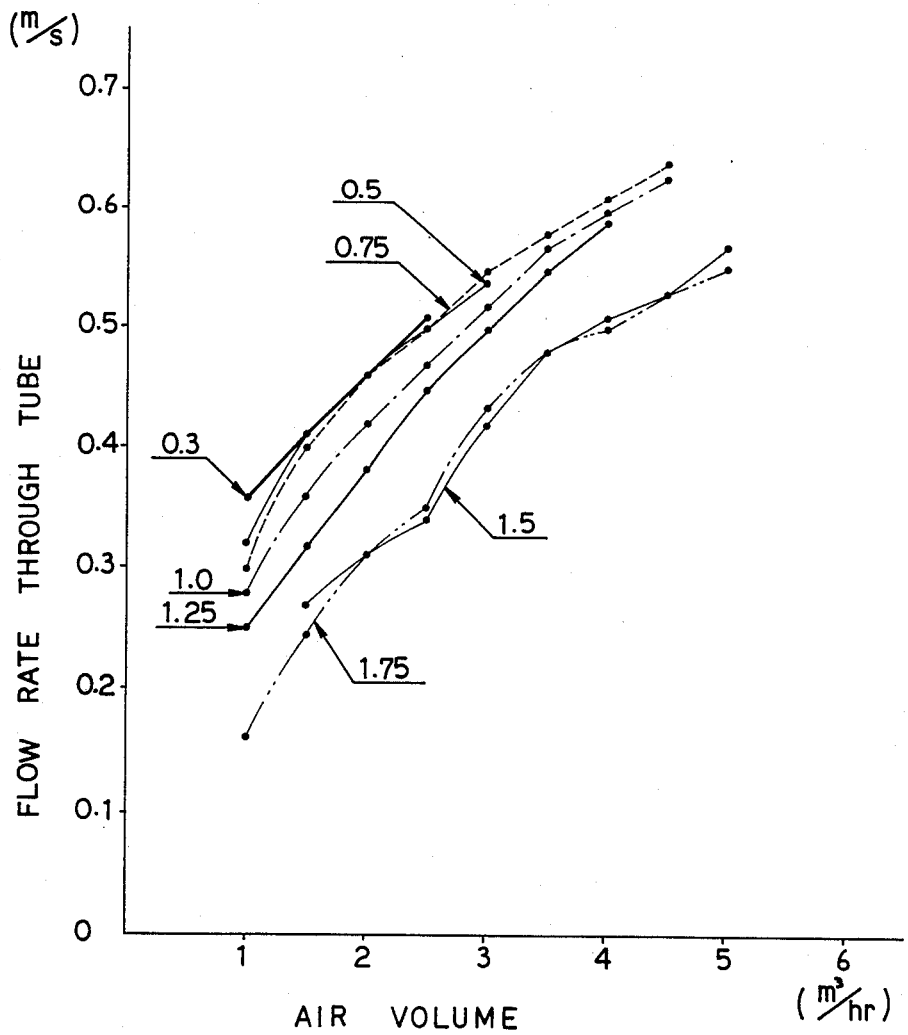
FIG. 3 is a diagram showing different curves that represent the relationship between the air flow rate and the corresponding quantity of air to be supplied.

As shown in FIG. 2, the apparatus includes an independen air chamber 25 which is located below the tube 1.

In its specific construction, the apparatus comprises a water diffuser tube 1 and an intermediate elongated air passage casing 20 which is interposed between the tube 1 and the air chamber 25. The air chamber 25 includes an inner casing 21 and an outer casing 22 that define two separate air rooms. The air rooms communicate with each other through holes 32. A top cover 23 is rigidly mounted over the air rooms 21 and 22, and a bottom plate 24 is rigidly mounted to the inner air room 21. An air supply hose 26 from any compressed air supply source (not shown) extends into the air chamber 25 through the top cover 23. Then, air is fed through the air hose 26 into the air chamber 25, as indicated by an arrow 27, and accumulates within the air chamber 25. As the air supply increases, the water within the air chamber is displaced, as indicated by an arrow 28. When the water level is lowered to the bottom end of the air passage casing at which time the bottom end is exposed, the air travels from the outer air room through the holes 32 into the inner air room, as indicated by arrows 29, 30, and 31. From the inner air room, the air goes into the air passage casing 20, from the top end of which the air enters the tube 1 as indicated by an arrow 33. As the air leaves the air passage casing 20 and enters the tube 1, it is formed into an air bubble or mass 34. As in the preceding example 6, the air bubble 34 expands, rising through the tube 21 in intimate contact with the inner wall thereof. As the air bubble rises, the water below it is drawn by the air bubble, and also rises at an increasing speed.

The two embodiments of the apparatus have been described, and it can be seen from each of those embodiments that when the air chamber has a small capacity, the average water flow rate increases as the number of air bubbles produced during a given period increases. As the capacity is made smaller, the number of air bubbles are produced consecutively. This causes a reduction in the overall performance. That is, the amount of water to be processed decreases with an increase in the number of air bubbles per time.

Conversely, when the air chamber has a large capacity (which is equal to more than 1.5 times the volume of an air mass), the average water flow rate drops drastically. In this situation, the inertial action of the rising water which is drawn upwardly by the preceding air mass cannot be utilized fully. This also causes a reduction in the overall performance.

From the above two cases, it may be seen that the air chamber should have a capacity that is equal to 0.3 to 1.2 times the quantity of air to be supplied. In general, this range should meet the operating requirements.

The optimal operating range should be 0.75 to 1.00 times the quantity of air to be supplied, since the consecutive air bubble masses would cause the performance degradation, as mentioned above.

The following examples are provided to describe the relationship between the length of the tube through which the air mass rises and the time interval at which those air masses are to be supplied.

EXAMPLE 8

This example is illustrated in FIG. 6. A water diffuser tube 3 which has a diameter of 40 cm and a length of 10 m is used in this example. The environmental parameters for the water resource, which in this case is a reservoir, are as follows:

The reservoir in which the tube 3 is installed is 20 m deep, and contains water which is at 20° C. near the surface and is at 10° C. near the bottom. In operation, air bubbles 4 are produced every ten seconds. FIG. 10 illustrates how the flow rate changes as a function of time in this case, starting with the point where an air bubble is formed and ending with the top end of the tube. The wave thus obtained has a peak that corresponds to the maximum 1.4 m/sec and a valley that corresponds to the minimum 1.1 m/sec.

How the diffused water circulates due to the temperature difference (convection action) is illustrated in FIG. 6, where 2 denotes the air chamber, 11 denotes the air supply pipe, 4 denotes the weight, and 5 denotes the bottom of the reservoir. The arrows 37a and 37b show the flow of the water.

EXAMPLE 9

Under the same conditions as in EXAMPLE 8, air bubbles are formed every 15 seconds. The resulting wave is shown in FIG. 9, where the peak corresponds to the maximum 1.4 mm/sec and the valley corresponds to the minimum 0.6 m/sec.

EXAMPLE 10

Under the same conditions as in EXAMPLE 8, air bubbles are formed every 30 seconds. The resulting waveform in FIG. 8 shows the maximum 1.4 m/sec and the minimum 0.2 m/sec.

In this example, the jet of water can diffuse radially over the wide area, covering the distance of 100 m from the location where the tube is installed.

EXAMPLE 11

In this example, a reservoir is 30 m deep is selected. The water contained in the reservoir is at 20° C. near the surface and at 8° C. near the bottom. A 40 cm diameter and 20 m long tube is installed. Under those conditions, air bubbles are formed every 25 seconds, and the resulting curve is similar to that in FIG. 10.

EXAMPLE 12

Under the same conditions as in EXAMPLE 11, air bubbles are produced every 25 seconds. The waveform similar to that in FIG. 9 is thus obtained.

EXAMPLE 13

Under the same conditions as in EXAMPLE 11, air bubbles are formed every 60 seconds. The waveform obtained in this example is similar to that in FIG. 8.

EXAMPLE 14

The water reservoir contains water 5 m deep, which is at 20° C. near the surface and at 15° C. near the bottom, and a 40 cm-diameter and 2 m-long tube (the passage through which an air mass is rising is 1.5 m long) is installed. Each succeeding air bubble is formed every 6 seconds, and the resulting curve is shown in FIG. 8. When it is formed every 4 seconds, the curve is obtained as shown in FIG. 9.

The various examples of the present invention have been shown and described. As it can be seen from the foregoing description, the method according to the present invention is advantageous in that the energy provided by the air mass can be utilized fully. This, energy efficiency is enhanced. This advantage is obtained by defining the capacity of the air chamber equal to 0.75 to 1.25 times the volume of an air bubble or mass.

Another advantage of the present invention is that the time interval T at which each air mass or bubble is to be supplied is specifically defined in relation to the length of the passage of the air bubble through the tube. That is, T is defined as $0.5|L| \leq T \leq 4$ to $6|L|$ for $L \geq 10$ m, $0.5 L \leq T \leq 10 L$ for $L \leq 10$ m, and $L \leq T$ for $L < 2$ m. When those conditions are met, the water pumping and diffusing efficiency can be increased. Thus, the amount of oxygen contained in the water resources can be increased by forcing the water to circulate between the surface and bottom. In addition, the apparatus that is designed to implement the above general equation defining the time interval T in relation to the length L can provide highly reliable functions.

Although the present invention has fully been described with reference to the various preferred embodiments thereof, it should be understood that various changes and modifications may be made without departing from the spirit and scope of the invention.

What is claimed is:

1. A method of using an apparatus having a water diffuser tube and a cylindrical air chamber in communication with and extending around a lower peripheral portion of the water diffuser tube adjacent a bottom open end of the tube, said method comprising:

disposing the diffuser tube and the cylindrical air chamber below the surface of a water source with the diffuser tube oriented vertically;

supplying a group of individual air bodies from the cylindrical air chamber into the diffuser tube;

forming said group into an air mass that has a volume between 0.75 and 1.25 times the volume of a sphere having a diameter equal to that of the diffuser tube within the diffuser tube so as to rise through the tube over a given distance to draw water through the diffuser tube from the bottom open end of the diffuser tube; and boostering the drawn water through the diffuser tube and diffusing the water out of the top end of the tube by supplying successive groups of said individual air bodies from the cylindrical air chamber into the diffuser tube and forming each of said successive groups into a said air mass, the forming of the air masses consisting of forming the air masses in succession according to the following conditions:

$$0.5L \leq T \leq 4L \text{ to } 6L, \text{ when } L \geq 10 \text{ meters} \quad (1)$$

$$0.5 \leq T \leq 10L, \text{ when } 2 \text{ meters} \leq L < 10 \text{ meters} \quad (2)$$

L(meters) being a length corresponding to said distance over which the air masses rise through the diffuser tube, and T (seconds) being the time interval between the formation of successive of air masses.

2. A method of using an apparatus as claimed in claim 1 and in which the cylindrical air chamber includes a first cylindrical jacket surrounding the lower peripheral portion so as to define a chamber therebetween, a second cylindrical jacket surounding the first cylindrical jacket, and a cylindrical partition extending between the first and the second cylindrical jackets, the cylindrical partition having aperture extending therethrough at an upper portion thereof, the inner cylindrical jacket having an aperture extending therethrough at a bottom portion thereof, wherein the step of supplying individual air bodies includes supplying pressurized air between the outer cylindrical jacket and the medium partition which passes through the apertures into the chamber defined between the inner cylindrical jacket and the diffuser tube.

3. A method as claimed in claim 1,
wherein the forming of the air masses is also performed according to the following conditions:

$$5 \text{ seconds} < T < 30 \text{ seconds when } 2 \text{ meters} < L < 10 \text{ meters} \quad (3)$$

$$15 \text{ seconds} < T < 100 \text{ seconds when } L \geqq 10 \text{ meters}. \quad (4)$$

4. A method as claimed in claim 1,
wherein the disposal of the diffuser tube below the surface of a water source comprises disposing the diffuser tube below the surface of the water source with the top end of the diffuser tube disposed one meter to twenty meters below said surface.

* * * * *